(12) United States Patent
Pudenz et al.

(10) Patent No.: US 9,323,968 B2
(45) Date of Patent: Apr. 26, 2016

(54) RFID READING APPARATUS FOR SHELF OCCUPANCY DETECTION

(71) Applicant: SICK AG, Waldkirch (DE)

(72) Inventors: Florian Pudenz, Waldkirch (DE); Dirk Struve, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/601,298

(22) Filed: Jan. 21, 2015

(65) Prior Publication Data

US 2015/0220764 A1 Aug. 6, 2015

(30) Foreign Application Priority Data

Feb. 4, 2014 (EP) .................................... 14153736

(51) Int. Cl.
*G06K 19/00* (2006.01)
*G06K 7/10* (2006.01)
*H01Q 1/22* (2006.01)
*H01Q 1/38* (2006.01)

(52) U.S. Cl.
CPC ........ *G06K 7/10415* (2013.01); *G06K 7/10336* (2013.01); *H01Q 1/2216* (2013.01); *H01Q 1/38* (2013.01)

(58) Field of Classification Search
USPC ............................ 235/487, 492; 340/10, 572
See application file for complete search history.

(56) References Cited

U.S. PATENT DOCUMENTS

| | | | |
|---|---|---|---|
| 7,310,070 B1 | 12/2007 | Hardman et al. | |
| 7,757,947 B2 | 7/2010 | Reznik et al. | |
| 2008/0284654 A1 | 11/2008 | Burnside et al. | |
| 2009/0085746 A1* | 4/2009 | Erickson ............. | G06K 7/0008 340/572.1 |
| 2009/0231140 A1 | 9/2009 | Hong et al. | |
| 2009/0322486 A1 | 12/2009 | Gerstel | |
| 2010/0156602 A1* | 6/2010 | Hiramatsu ............ | G08C 25/00 340/10.1 |

FOREIGN PATENT DOCUMENTS

| | | |
|---|---|---|
| EP | 1574776 B1 | 8/2007 |
| EP | 2234043 A1 | 3/2010 |
| WO | 2004102735 A2 | 11/2004 |
| WO | 2007050248 A1 | 5/2007 |
| WO | 2009011601 A1 | 1/2009 |
| WO | 2010151132 A1 | 12/2010 |

OTHER PUBLICATIONS

Office Action mailed Jun. 25, 2014 for corresponding Application EP 14153736.5 (in German).

* cited by examiner

*Primary Examiner* — Matthew Mikels
(74) *Attorney, Agent, or Firm* — Nath, Goldberg & Meyer; Jerald L. Meyer; Stanley N Protigal

(57) ABSTRACT

An RFID reading apparatus (20) for shelf occupancy detection, the RFID reading apparatus (20) having an antenna (16, 18, 24), wherein the antenna (16, 18, 24) comprises a housing and an antenna circuit board (24) arranged in the housing, wherein the housing has an elongate hollow profile element (18) with the antenna circuit board (24) inserted into the hollow profile element (18).

19 Claims, 3 Drawing Sheets

RFID READING APPARATUS FOR SHELF OCCUPANCY DETECTION

Figure 1:
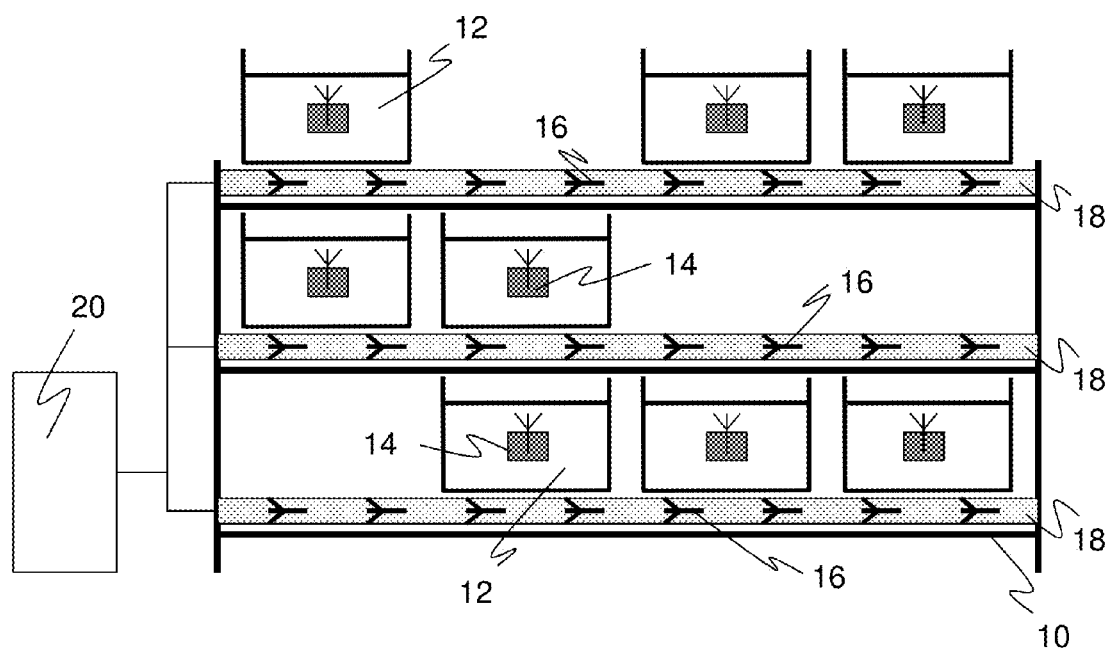

The invention relates to an RFID reading apparatus with an antenna for shelf occupancy detection according to claim 1.

RFID reading systems are used for automatic identification of objects. RFID transponders attached to the objects are read and, where appropriate, information is written back into the transponder. The collected information is used to detect the location, the destination or other properties of the object and to thus control storage and flow of goods and product.

RFID transponders generally can be active, i.e. have their own power supply, or be passive. Regardless whether they are active or passive components, RFID transponders according to the backscatter principle are characterized in that they reflect the transmission signal of the reading apparatus and in doing so modify the amplitude by modulation. They do not generate a separate high frequency signal. Active transponders are less suited for the applications as discussed because unit prices of such transponders cannot achieve a required low level for the mass market due to the power supply. Therefore, passive transponders without their own power supply are generally used. In either case, the transponder is excited by the electromagnetic radiation of the reading apparatus to transmit the stored information, wherein passive transponders obtain the necessary energy from the transmission power of the reading system. In the established ultra-high frequency standard (UHF) ISO 18000-6, passive transponders are read according to the backscatter method.

The objects bearing the transponders are often stacked, in particular for storage, in an ordered fashion and are arranged in several layers or rows. A typical example is a rack having shelves or rows of containers. In this case the RFID reading system should meet the requirement to detect the current shelf occupancy, i.e. which shelves are occupied or whether there is a container at a specific shelf position, and what the content of the respective shelf or container is. By writing back to the transponder, information of the transponders can be kept consistent even after refilling or removal of objects. Transponders may be located both at the respective shelves or containers and on the individual objects stored therein. An application for the automatic detection of shelf occupancy is production process control, where the storage can be significantly reduced by knowledge of the local stocks and the current demand of raw materials and intermediate products measured by the objects taken (Kanban principle).

RFID systems for shelf occupancy detection have to cope with the small distances between shelves, and with shelves or objects made of metal. In case of containers rows instead of shelves, the containers may also be made of metal, and additionally their dimensions and positions within the rows may vary.

Prior art RFID systems for shelf occupancy detection use remote antennas per shelf row, container row, or even container. The actual RIFD reading apparatus is for example attached to the shelf at the side. This causes considerable costs for installation of the antennas and especially their wiring. These are not even one-time costs, but will repeat for maintenance or changes of the shelf, for example when using different containers. One example is EP 2 234 043 disclosing a movable shelve system for a library with an RFID system reading transponders at the individual books. To that end, UHF antennas are provided at the individual shelf layers. U.S. Pat. No. 7,757,947 or US 2009/0322486 A1 each disclose a storage rack whose storage containers are each provided with an antenna. In a further shelf arrangement with RFID antennas according to WO 2007/050248 A1, antennas are mounted between bars of the shelf and are subsequently encased.

Without having any connection with RFID technology, it is known for example from EP 1 574 776 B1 to manufacture light grid housings in an extrusion process. Light grids, although usable for a plurality of applications, are not at all suitable as a substitute for an RFID reading apparatus for shelf occupancy detection.

It is therefore an object of the invention to provide an RFID reading apparatus which is more suitable for shelf occupancy detection.

This object is satisfied by an RFID reading apparatus for shelf occupancy detection, the
RFID reading apparatus having an antenna, wherein the antenna comprises a housing and an antenna circuit board arranged in the housing, wherein the housing has an elongate hollow profile element with the antenna circuit board inserted into the hollow profile element.

The object is also satisfied by a method for reading RFID transponders on shelves or objects on the shelves for shelve occupancy detection using an RFID reading apparatus having an antenna, wherein the antenna comprises a housing and an antenna circuit board arranged in the housing, wherein the housing has an elongate hollow profile element with the antenna circuit board inserted into the hollow profile element.

The invention starts form the basic idea to form the housing of the antenna like a rod. In this way, it can be easily connected with or integrated into the rack structure at the desired position. An elongated hollow profile meets this requirement and allows accommodating an antenna circuit board. This can for example be inserted from the front side, or the hollow profile is slightly bent open at its longitudinal side, whereupon it springs back into its original shape after insertion of the antenna circuit board and safely holds the antenna circuit board. The hollow profile preferably comprises a guide rail or guide groove for holding the antenna circuit board irrespective of the type of mounting.

The invention has the advantage that a particularly compact and robust design with integrated antennas at a high antenna density in a housing is achieved. There are practically no wiring costs. The hollow profile provides a plurality of geometric degrees of freedom with simple production. The antenna circuit board supports a modular construction and offers numerous options for the antenna design.

The hollow profile element preferably has the same cross section over its entire length. This facilitates manufacturing and handling. Additionally, antennas of almost any length can be prepared in this way. Throughout the description, preferably refers to a preferred, but completely optional feature.

The hollow profile element preferably is an extruded profile. This technique is suitable to produce a hollow profile of desired cross section in various lengths.

The antenna circuit board preferably comprises a slot structure or an antenna patch. The slot structure or the antenna patch form an antenna transmitter which for example is excited by a coupling circuit board additionally inserted into the hollow profile element, or vice versa. The antenna circuit board can also take over the function of the coupling circuit board in a sandwich structure.

The hollow profile element, in cross section, preferably has a folded outer contour with a plurality of notches and/or projections. Thus, the outer contour of the housing already is the antenna structure. In a sectional view, the hollow profile is not simply formed circular or rectangular, but is folded into a two-dimensional pattern. Thereby, notches and projections, respectively, form a branched metal structure. Despite the very compact size of the hollow profile element, the outer contour has a length required for the antenna structure and its desired resonance frequency by means of the folding. The antenna circuit board is needed only for the feeding.

Several antenna circuit boards preferably are inserted into the hollow profile element next to one another, and thus a plurality of antenna modules is formed. Thus, a hollow profile element of variable length can be fitted, and a variety of different antenna sizes can be obtained in an integrated concept with low production costs. Each of the antenna circuit boards may already provide several individual antennas, in particular, for reducing the number of components, provide the same number of individual antennas for each antenna circuit board.

The antenna modules preferably are controlled individually or in combination in order to read transponders with the antenna at a specific antenna section. If an antenna circuit board comprises several individual antennas, the individual antennas preferably are controlled individually or in combination. The antenna section corresponds to a particular reading region along the hollow profile element, such as a shelf, a rack section, or a container stored there.

The RFID reading apparatus preferably is configured to associate antenna modules with shelf sections. For antenna circuit boards with several individual antennas, the association may also be done on a level of individual antennas instead of antenna modules. From a functional point of view, an antenna per shelf section, compartment or container is formed.

The antenna preferably comprises display elements associated with the antenna modules. This gives the user a visual, position-specific feedback. The display may be inserted into the hollow profile element via the antenna circuit board or an additional circuit board by forming corresponding openings to the outside into the hollow profile element for viewing the display. Very small openings suffice to let a light source, like an LED, or even only its light come to the outside. By blinking sequences of colors, various bits of information can be displayed with one LED.

The antenna circuit board preferably comprises matching elements for matching antenna characteristics. A matching can for example be done by controllable capacities.

Unused antennas are detuned, or not excited in the first place, or directivity orthogonal to the longitudinal direction of the hollow profile element is improved in order to detect transponders in a particular shelf section.

The hollow profile element preferably is arranged parallel to shelf elements or is used as a shelf element. Depending on the embodiment, the hollow profile element is part of the shelf, is used to stabilize the shelf, or at least is incorporated into the shelf so that it does not interfere with operation, in contrast to a conventional wiring. The hollow profile can be mounted horizontally or vertically, in order to specifically detect shelf sections or containers in a corresponding arrangement.

At least one system circuit board having components of the RFID reading apparatus preferably is inserted into the hollow profile element. The hollow profile element thus is not only the housing of the antenna, but also of additional system components, in particular an operational RFID reading apparatus. The system circuit board comprises circuits for controlling the antenna and for processing RFID signals received by the antenna. Alternatively to a system circuit board, the additional elements of the RFID reading apparatus are at least partially separated, i.e. the hollow profile element includes only the antenna, or only a part of the other circuits of the RFID reading apparatus. It is also conceivable to use several hollow profile elements, some of which include a system circuit part and some of which do not, so as to expand the reading area by additional antennas.

The system circuit board preferably also is a coupling circuit board for the antenna. This may be needed to complete the antenna, depending on the design of the antenna circuit board and the outer contour of the hollow profile element.

Several system circuit boards preferably are inserted next to one another into the hollow profile element. The RFID reading apparatus thus is modular also in this respect and can very easily be adapted to different lengths. The system circuit boards are not necessarily identical among each other, although this is possible and the most consistent modular design. For example, some system circuit boards may be used as mere connectors only to pass signals on, or merely feed the antennas, control the local display, or preprocess RFID signals. It is also conceivable that the system circuit boards make a complete RFID reading module from each relevant section, so that the system circuit boards form a modular network reading system.

The RFID reading apparatus preferably comprises a sensor for object presence detection. This sensor for example is an optoelectronic sensor, such as a light barrier or a light scanner, but may also be based on a different physical principle like an ultrasonic sensor, or may be mechanical like a button. The additional sensor may function as a trigger for triggering reading of a transponder. The additional sensor can be integrated into the housing of the antenna or be arranged separately.

In a preferred embodiment, the antenna itself is used as the sensor. To this end, the matching of the antenna is repeatedly interrogated to detect a change in the environment in this manner. The antenna tunes itself to be matched for an additional container put into the shelf, and at the same time interprets this as a trigger for a reading operation at this position.

The method in accordance with the invention can be further developed in a similar manner with additional features and shows similar advantages. Such advantageous features are described in an exemplary, but not exclusive manner in the subordinate claims following the independent claims.

Figure 2:
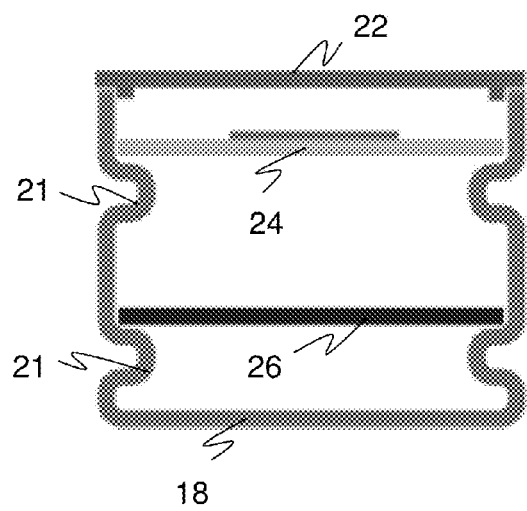
Figure 3:
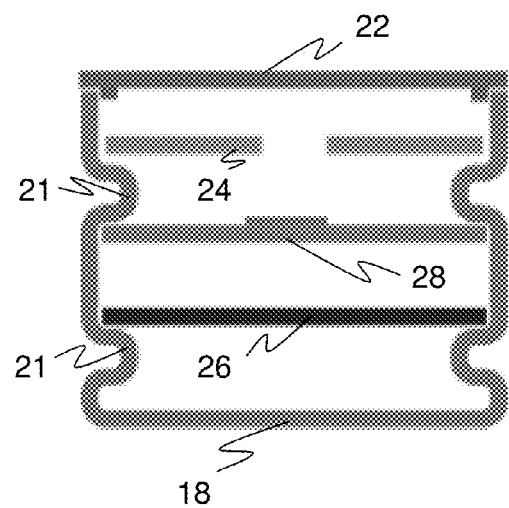
Figure 4:
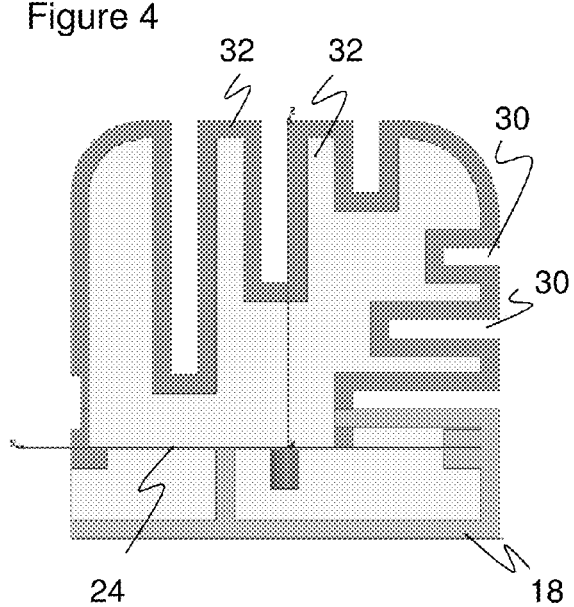
Figure 5:
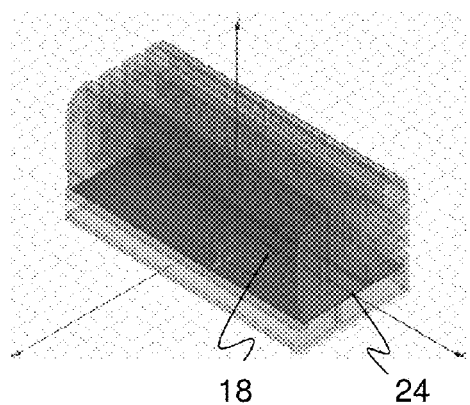
Figure 6:
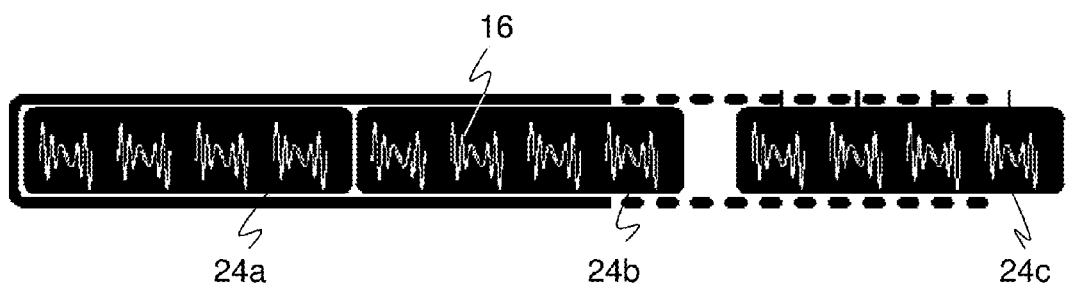
Figure 7A:
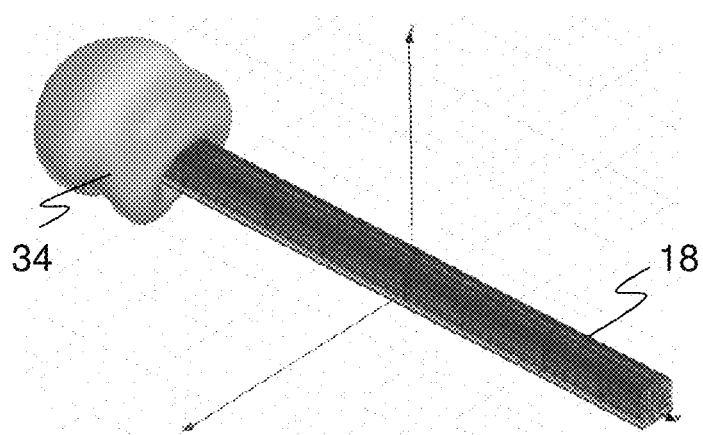
Figure 7B:
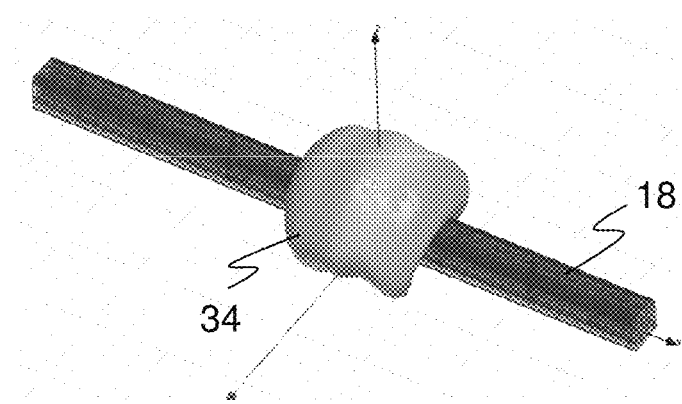
Figure 7C:
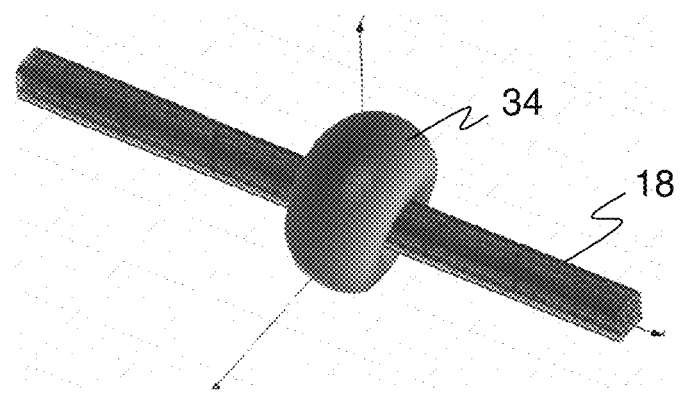

The invention will be explained in the following also with respect to further advantages and features with reference to exemplary embodiments and the enclosed drawing. The Figures of the drawing show in:

FIG. 1 an overview of a shelf with an RFID reading apparatus for shelf occupancy detection;

FIG. 2 a cross-sectional view of a hollow profile with an embodiment of an antenna;

FIG. 3 a cross-sectional view of a hollow profile with another embodiment of an antenna;

FIG. 4 a cross-sectional view of a hollow profile whose outer contour itself is an antenna structure by folding;

FIG. 5 a three-dimensional representation of the hollow profile according to FIG. 4;

FIG. 6 a plan view of several antenna circuit boards which can be modularly inserted into a hollow profile;

FIG. 7a-c a representation of the respective radiation pattern of an antenna according to FIG. 5 for various combinations and matching of its individual antennas.

FIG. 1 shows an overview of a rack or shelf 10 having a plurality of shelves or compartments for containers 12, in particular Kanban containers. In the containers, objects are stored, which are not shown. In other embodiments, the shelves or compartments may be separated, or objects may be stored without containers 12. The containers 12 and/or the objects stored therein are equipped with transponders 14.

At the shelf 10, several elongated antennas having a plurality of individual antennas 16 are arranged. The antennas each have an elongated hollow profile 18 as a housing, wherein circuit boards are inserted. The exact construction of the antennas will be explained in more detail below. The antennas are part of an RFID reading apparatus 20 which in FIG. 1 is shown as a separate block. As an alternative, it is also possible to at least partially, if not completely, integrate the RFID reading apparatus into the hollow profiles 18.

The RFID reading apparatus 20 reads the transponders 14 in a known manner. As a result, objects and containers 12 are detected and assigned to specific storage locations, i.e. positions on the shelf 10. The RFID reading apparatus 20, or a higher-level system (Warehouse Management, ERP) to which the RFID readings apparatus 20 is connected, thus knows the current respective content of the shelf 10 in terms of containers 12 and objects. By the way, the usual term RFID reading apparatus 20 does not exclude that information is also written into the transponders 14, but reading usually is the more important task.

Display or control elements associated with the containers 12 or corresponding shelf sections may be provided, but are not shown in FIG. 1, such as liquid crystal displays, touch pads, or simple LEDs. This is to give the user a localized optical feedback, or to enter information about the container 12 or notify a higher-level management system. Some application examples are error messages, displaying an occupancy status, presence information of a container 12, entering a refill or pickup, displaying objects to be refilled or picked up ("Pick-to-Light", "Put-to-Light"), displaying state information of the antenna including a current association of individual antennas 16 and shelf sections, or displaying the information read from the transponder 14. For displaying most of this information, simple blinking or color codes of cheap LEDs are sufficient.

The actual identification of containers 12 and objects stored therein is done by RFID readings. Nevertheless, it could be useful to merely detect the presence of containers 12 or objects independent of RFID readings. This can for example be used to locate the read RIFD information, i.e. to assign it with specific objects, or to trigger an RFID reading. One or more additional sensors may be provided for this purpose, which are not shown, such as light barriers detecting whether or not there is a container 12 at the respective position. Placing a container 12 then may be used as a trigger for an RFID reading, so that the possible container positions can be checked specifically and not blindly for example in a time-division multiplexing. Removing and adding objects can be detected similarly. The respective additional sensor 18 may be integrated into the hollow profile 18. As an alternative, separate sensors are mounted at possible container positions.

It is also conceivable that the individual antennas 16 themselves act as additional sensors. The containers 12 or objects influence the antenna properties, and this may be detected by the control of the individual antennas 16 without actually reading RFID information. In this embodiment, therefore, the individual antennas 16 are repeatedly checked for changes in their environment. For example, an RFID reading apparatus 20 measures a change in the matching of an individual antenna, re-matches this individual antenna 16, and at the same time interprets this event as a trigger for an RFID reading, because possibly a new container 12 is placed at a position which previously was empty, or transponders 14 have entered the reading area in another way.

FIG. 2 shows a cross-sectional view of the hollow profile 18 which is used as the antenna housing. The hollow profile 18 preferably has the same cross section over its entire length, and is for example produced by extrusion. Thus, a hollow profile 18 of required length is made, or a part of required length is cut from a blank several meters long. It is also possible to arrange and connect several hollow profiles 18 in sequence.

With a lateral recess, guide grooves or guide rails 21 are formed in the hollow profile 18 supporting circuit boards or insertion boards which are inserted into the hollow profile 18. At the top, the hollow profile 18 is closed by a cover 22.

An antenna circuit board 24 provides desired antenna properties for the hollow profile 18. The antenna circuit board 24 in this embodiment has one or more patch antennas as individual antennas 16, or as an alternative has a different compact antenna construction based on ceramic. In addition, a system circuit board 26 is provided, having circuits of the RFID reading apparatus 20 for controlling the individual antennas 16. The system circuit board 26 may also comprise a display, an LED, and the corresponding control electronics. When no system circuit board 26 is provided, the hollow profile 18 with the antenna circuit board 24 is only used as an antenna.

FIG. 3 shows a cross-sectional view of another embodiment of the hollow profile 18. In contrast to FIG. 2, this antenna is a slot radiator, with the antenna circuit board 24 having a slot structure and with an additional coupling circuit board 28 for its feeding.

FIG. 4 shows a cross-sectional view of a hollow profile 18 whose outer contour itself is used as an antenna structure. For this purpose, the outer contour is folded several times and thus forms a plurality of indentations or grooves 30 and protrusions 32. This results in a branched structure so that the length of a slot radiator required for a desired resonance frequency is achieved despite the very compact design. In this design, the antenna circuit board 24 acts as a coupling circuit board for feeding the antenna. The antenna circuit board 24 may also, in a dual function, form a system circuit board for circuits of the system electronics of the RFID reading apparatus 20. In FIG. 5, the hollow profile 18 according to FIG. 4 is shown once mot in a three-dimensional view.

FIG. 6 shows a plan view of a modular arrangement of several antenna circuit boards 24*a-c* which are inserted into the hollow profile 18 one after the other. Each antenna circuit board 24*a-c* itself may comprise one or more individual antennas 16.

The hollow profile 18 with its length should preferably cover typical shelf widths. As already mentioned several times, it is perfectly possible to make hollow profiles 18 of almost any required length. However, there would still be considerably costs for the variants of the antenna circuit boards 24. The modular design according to FIG. 6 with several consecutive antenna circuit boards 24*a-c* significantly reduces these costs, because the number of individual antennas 16 can be selected almost freely. Different device variants thus comprise a number of identical antenna circuit boards 24*a-c* depending on the length of the hollow profile 18. The individual antennas 16 can be controlled both individually and in combination, for example may be switched on and off.

The compact antenna structures can be influenced by changes in the environment, such as the shelf 10 where the hollow profiles 18 are installed. Containers 12 and objects and content stored therein can also detune the individual antennas 16. At sufficiently close proximity, the antenna structures also influence one another. Therefore, it is advantageous to compensate these effects by adaption. This is achieved by intelligent dynamic matching of the antenna characteristics, for example by means of controllable capacities on the antenna circuit board 24. A change in capacity causes a shift of the resonance frequency of the antenna. By intelligent control and tuning of the individual antennas 16, respectively, it is achieved that individual antennas 16 not in use are not excited because they are not in resonance at the respective point in time. This increases robustness against environmental changes and achieves a decoupling of the individual antennas 16 among one another.

As long as no fixed shelf compartments are provided, the division of the width of the shelf 10 into widths of the containers 12 varies as required and is defined by the containers 12 actually in use. The division may vary even during operation at least a few times per year. Conventionally, this requires a re-installation with new wiring. By the modular construction according to the invention with several antenna circuit boards 24*a*-*c* and several individual antennas 16, respectively, the adaption can be done with the same hardware and only very little effort in order to adapt the RFID reading apparatus 20 to a different division of the shelf 10 into positions for the containers 12.

This makes use of the individual antennas 16 being controllable both individually and in combination. Therefore, the adaption to a new division requires only a change of software parameters. With an intelligent control of the antennas, the apparatus can be adapted very specifically to the container 12 or row width and specific transponder 14 positions, and by combining individual antennas 16 there is also the possibility to increase the directivity and gain of the individual antennas 16. Even otherwise barely or not readable transponders 14 thus can be more reliably detected.

FIG. 7 illustrates this matching of the antenna properties and shows beam characteristics 34 at operation of different individual antennas 16 or combinations of individual antennas 16. In FIGS. 7*a* and 7*b* a single antenna at the edge and in the middle of the hollow profile 18, respectively, is operated. This clearly already achieves a localization to a specific section of the hollow profile 18 and thus an important step. However, as shown in FIG. 7*c*, by combined operation of several individual antennas 17, the beam characteristics and directivity can still be significantly improved, in order to really detect transponders 14 only in the desired section, and to also be particularly sensitive for these transponders 14.

The invention claimed is:

1. An RFID reading apparatus (20) for shelf occupancy detection, the RFID reading apparatus (20) having an antenna (16, 18, 24), the RFID reading apparatus comprising;
   a housing having a hollow profile element (18), the hollow profile element comprising supports formed as lateral indentations, guide grooves or guide rails for supporting printed circuit boards (PCBs); and
   at least one printed circuit board mounted on the supports and comprising an antenna circuit board (24), wherein the elongate hollow profile element (18) houses the antenna circuit board (24), with the antenna circuit board (24) inserted into the hollow profile element (18).

2. An RFID reading device (20) with an antenna (16, 18, 24) for a shelf occupancy detector, wherein an elongate housing houses the antenna arranged in an antenna circuit board (24), characterized in that:
   the housing comprises a hollow profile element (18), having formed therein lateral indentations guide grooves or guide rails for supporting PCBs (24, 26), and the antenna circuit board (24) and at least one further system circuit board (26) are used with circuits of the RFID reader (20) for driving the antenna (16, 18, 24) and for processing with the antenna (16, 18, 24) received RFID signals in the hollow profile element (18).

3. The RFID reading apparatus (20) of claim 2, wherein the hollow profile element (18) has the same cross section over its entire length.

4. The RFID reading apparatus (20) of claim 3, wherein the hollow profile element (18) is an extruded profile.

5. The RFID reading apparatus (20) of claim 2, wherein the antenna circuit board (24) comprises a slot structure or an antenna patch.

6. The RFID reading apparatus (20) of claim 2, wherein the hollow profile element (18), in cross section, has a folded outer contour with a plurality of notches (30) and/or projections (32).

7. The RFID reading apparatus (20) of claim 2, wherein several antenna circuit boards (24*a*-*c*) are inserted into the hollow profile element (18) next to one another, and thus a plurality of antenna modules (24*a*-*c*, 16) is formed.

8. The RFID reading apparatus (20) of claim 7, wherein the antenna modules (24*a*-*c*, 16) are controlled individually or in combination in order to read transponders (14) with the antenna at a specific antenna section.

9. The RFID reading apparatus (20) of claim 7, which is configured to associate antenna modules (24*a*-*c*, 16) with shelf sections.

10. The RFID reading apparatus (20) of claim 7, wherein the antenna comprises display elements associated with the antenna modules (24*a*-*c*, 16).

11. The RFID reading apparatus (20) of claim 2, wherein the antenna circuit board (24) comprises matching elements for matching antenna characteristics.

12. The RFID reading apparatus (20) of claim 2, wherein the hollow profile element (18) is arranged parallel to shelf elements (10) or is used as a shelf element (10).

13. The RFID reading apparatus (20) of claim 2, wherein at least one system circuit board (26) having components of the RFID reading apparatus (20) is inserted into the hollow profile element (18).

14. The RFID reading apparatus (20) of claim 13, wherein the system circuit board (26) also is a coupling circuit board for the antenna (16).

15. The RFID reading apparatus (20) of claim 13, wherein several system circuit boards (26) are inserted next to one another into the hollow profile element (18).

16. The RFID reading apparatus (20) of claim 2, comprising a sensor for object presence detection.

17. The RFID reading apparatus (20) of claim 16, wherein the antenna (16, 18, 24) is used as the sensor.

18. A method for reading RFID transponders (14) on shelves or objects on the shelves for shelve occupancy detection using an RFID reading apparatus (20) according to claim 2.

19. An RFID reading apparatus (20) for shelf occupancy detection, the RFID reading apparatus (20) having an antenna (16, 18, 24), the RFID apparatus (20) comprising:
   a housing having a hollow profile element (18) having a continuous extruded cross-sectional profile along its length, the hollow profile element comprising supports formed as lateral indentations, guide grooves or guide rails; and
   at least one printed circuit board mounted on the supports and comprising an antenna circuit board (24) and at least one system circuit board (26) mounted on the supports and used with circuits of an RFID reader for driving the antenna (16, 18, 24) and for processing RFID signals received through the antenna (16, 18, 24), wherein the elongate hollow profile element (18) houses the antenna circuit board (24), with the antenna circuit board (24) inserted into the hollow profile element (18).

* * * * *